United States Patent

Bjork et al.

[15] 3,692,824
[45] Sept. 19, 1972

[54] NOVEL 3,5-SUBSTITUTED 2,4,6-TRIIODOBENZOIC ACIDS AND SALTS THEREOF

[72] Inventors: Lars Bjork, Uno E. Erikson, Bjorn G.-A. Ingelman, all of Upsala, Sweden

[73] Assignee: Pharmacia Aktiebolog, Uppsala, Sweden

[22] Filed: April 10, 1970

[21] Appl. No.: 27,437

Related U.S. Application Data

[63] Continuation-in-part of Ser. No. 689,724, Dec. 11, 1967, abandoned.

[30] Foreign Application Priority Data

Dec. 13, 1966   Sweden ............... 17053/1966

[52] U.S. Cl. ................. 260/501.11, 260/519, 424/5
[51] Int. Cl. ........................................... C07c 103/32
[58] Field of Search ..................... 260/501.11, 519

[56] References Cited

UNITED STATES PATENTS 3,542,861   11/1970   Ackerman ................. 260/519

Primary Examiner—Lorraine A. Weinberger
Assistant Examiner—L. Arnold Thaxton
Attorney—Fred C. Philpitt

[57] ABSTRACT

Iodo compounds useful in the X-ray visualization of body cavities, of the formula:

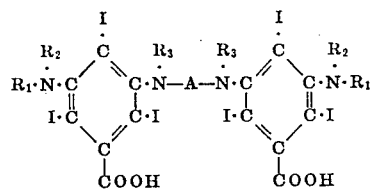

wherein $R_1$ is methyl or ethyl and $R_2$ and $R_3$ are each acetyl or propionyl and wherein A is an alkylene group substituted by at least one hydroxy group, said alkylene containing from three to 15 carbon atoms and being optionally broken by one or more oxygen bridges; or physiologically acceptable salts of said compounds.

12 Claims, No Drawings (wherein $A_1$ is —$CH_2.CH(OH).CH_2.O.(CH_2)_4.O.CH_2.CH(OH).CH_2$—)

Aqueous solutions of the methylglucamine salt of this dicarboxylic acid have been tested clinically in, e.g., angiography with excellent results.

The reaction can be carried out at different temperatures, for example, in range of 0°C to 50°C such as 20°C, 30°C and 40°C.

EXAMPLE 1

0.1 mole of 3-acetylamino-5-acetyl-methylamino-2,4,6-triiodobenzoic acid was dissolved in 50 ml of an aqueous 4 N solution of sodium hydroxide. 0.05 mole of bis[2,3-epoxypropyl]ether was slowly added dropwise to the solution at 40°C under agitation for 4 hours. The reaction mixture was then allowed to stand for 24 hours at 20°C, whereupon an aqueous 6 N solution of hydrogen chloride was added in an amount sufficient to precipitate the dicarboxylic acid formed during the reaction. The acid was cleansed by washing it with water and repeated precipitations, and the acid finally dried under vacuum at 50°C. The yield of the dicarboxylic acid was about 60 grams.

Solutions may be prepared from the obtained acid by adding water and, e.g., equivalent amounts of sodium hydroxide or methyl glucamine.

EXAMPLE 2

0.1 mole of 3-acetylamino-5-acetyl-methylamino-2,4,6-triiodobenzoic acid was dissolved in 50 ml of an aqueous 4 N solution of sodium hydroxide. 0.05 mole of 1,2-ethanedioldiglycide ether was slowly added to the solution dropwise at 40°C under agitation for 4 hours. The reaction mixture was then allowed to stand for 24 hours at 20°C, whereupon an aqueous 6 N solution of hydrogen chloride was added in an amount sufficient to precipitate the dicarboxylic acid formed in the reaction. The acid was cleansed by washing with water and repeated precipitations were effected and said acid dried under vacuum at 50°C. The yield of dicarboxylic acid was about 60 grams.

Solutions can be prepared from the obtained acid by adding water and, e.g., equivalent amounts of sodium hydroxide or methyl glucamine.

EXAMPLE 3

0.1 mole of 3-acetylamino-5-acetyl-methylamino-2,4,6-triiodobenzoic acid was dissolved in 50 ml of an aqueous 4 N solution of sodium hydroxide. 0.05 mole of 1,4-butanedioldiglycide ether was slowly added to the mixture dropwise at 40°C under agitation for 4 hours. The reaction mixture was then allowed to stand for 24 hours at 20°C, whereupon an aqueous 6 N solution of hydrogen chloride was added in an amount sufficient to precipitate the dicarboxylic acid formed in the reaction. The acid was cleansed by washing and repeated precipitations, and said acid dried under vacuum at 50°C. The yield of dicarboxylic acid was about 60 grams.

The obtained acid can be transferred into salts, from which aqueous solutions can be prepared as in Example 1 and Example 2.

EXAMPLE 4

In a similar manner to that of example 1, 0.1 mole of 3-acetylamino-5-acetyl-methylamino-2,4,6-triiodobenzoic acid was reacted with 0.05 mole of epichlorohydrin or with 0.05 mole of epibromohydrin or with 0.05 mole of dichlorohydrin.

Cleansing of the dicarboxylic acid formed in the reaction carried out in a manner similar to that of Example 1.

EXAMPLE 5

Solutions were prepared from each of the dicarboxylic acids obtained in examples 1,2, 3 and 4, in the following manner.

35 grams of substance and equivalent amounts of methyl glucamine were dissolved in water to a solution volume of 100 ml. pH was adjusted to 7.3 — 7.4. The solution was filtered and poured into bottles, which were sealed and sterilized in an autoclave.

EXAMPLE 6

The solutions from Example 5 were injected in the blood vessels of rabbits, whereupon the blood vessels were made visible by X-rays and photographs.

After a while, e.g. after 30 minutes, 1 hour and 2 hours, X-ray exposure and photographing of the gastroarea showed a good contrast filling of the gall bladder and bile ducts.

EXAMPLE 7

Solutions from example 5 were administered orally to rabbits whereafter the gastro-intestinal tract were made visible by X-rays and photographs, with excellent results.

EXAMPLE 8

Solutions of sodium salt of the compounds prepared in a manner similar to that of example 5 containing 20 grams of dicarboxylic acids per 100 ml solution were administered in the form of an enema to rabbits, whereupon the intestines could be observed by X-rays and photographs; with good results.

EXAMPLE 9

0.1 mole of 3-acetylamino-5-acetyl-methylamino-2,4,6-triiodobenzoic acid was dissolved in 50 ml of an aqueous 4N solution of sodiumhydroxide. 0.05 mole of 1,3-butanedioldiglycide ether

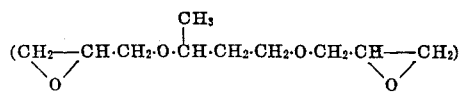

was slowly added to the mixture dropwise at 30°C while stirring for 6 hours.

The reaction mixture was then left at 20°C for 48 hours, whereupon an aqueous 6N solution of hydrogen chloride was added in an amount sufficient to precipitate the dicarboxylic acid formed in the reaction. The acid was cleansed by washing and repeated precipitations, and said acid dried under vacuum at 50°C. The yield of dicarboxylic acid was about 60 grams.

Solutions can be prepared from the obtained dicarboxylic acid by adding water and, e.g., equivalent amounts of sodium hydroxide or methyl glucamine.

40 grams of the dicarboxylic acid and equivalent amounts of methyl glucamine were dissolved in water to a solution volume of 100 ml. pH was adjusted to 7.3 – 7.4. The solution was filtered and poured into bottles, which were sealed and sterilized in an autoclave at 110°C for 30 minutes. The solution was injected in the blood vessels of rabbits, whereupon the blood vessels were made visible by X-rays and photographs.

EXAMPLE 10

In the same manner as that of example 9, 0.1 mole of 3-acetylamino-5-acetyl-methylamino-2,4,6-triiodobenzoic acid was reacted with 0.05 mole of 1:2, 3:4-diepoxybutane

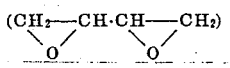

The cleansing of the dicarboxylic acid formed in the reaction was carried out in the same manner as that of example 9. A solution was prepared and tested in rabbits in the same manner as that of example 9.

EXAMPLE 11

In the same manner as that of example 9, 0.1 mole of 3-acetylamino-5-acetyl-methylamino-2,4,6-triiodobenzoic acid was reacted with 0.05 mole of 1,3-glyceroldiglycide ether

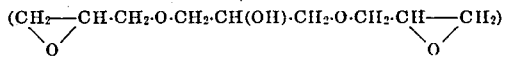

The cleansing of the dicarboxylic acid formed in the reaction was carried out in a manner similar to that of example 9.

45 grams of the dicarboxylic acid and equivalent amounts of sodium hydroxide were dissolved in water to a solution volume of 100 ml. pH was adjusted to 7 and the solution was sterilized in an autoclave. The solution was administered orally to rabbits, whereafter the gastro-intestinal tract was made visible by X-rays and photographs, with very good results.

EXAMPLE 12

0.1 mole of 3-acetylamino-5-acetyl-ethylamino-2,4,6-triiodobenzoic acid was dissolved in 90 ml of an aqueous 2N solution of sodium hydroxide. 0.05 mole of 1,4-butanedioldiglycide ether

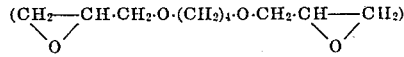

was slowly added to the mixture dropwise at 30°C while stirring for 6 hours. The reaction mixture was then left at 20°C for 2 days, whereupon the dicarboxylic acid formed in the reaction was precipitated with HCl and cleansed in the same way as in example 9. A solution of the methyl glucamine salt was prepared and tested in rabbits in the same manner as in example 9, with good results.

EXAMPLE 13

In a similar manner to that of example 12, 0.1 mole of 3-acetylamino-5-acetyl-ethylamino-2,4,6-triiodobenzoic acid was reacted with 0.05 mole of 1:2, 3:4-diepoxybutane

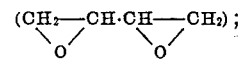

the dicarboxylic acid formed in the reaction was cleansed and tested in rabbits in a similar manner to that of example 12.

EXAMPLE 14

1 mole of 3-acetylamino-5-acetyl-methylamino-2,4,6-triiodobenzoic acid was dissolved in 560 ml of an aqueous 2.2N solution of sodium hydroxide. 0.45 mole of 1,4-butanedioldiglycide ether

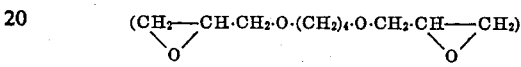

was slowly added to the mixture dropwise for 8 hours at 25°C with continuous stirring. The reaction mixture was then left at 20°C for 64 hours, whereupon it was diluted with twice its volume of water and an aqueous 5N solution of hydrogen chloride was added in an amount sufficient to precipitate the dicarboxylic acid formed in the reaction.

The acid was cleansed by washing with water, and the product was dried under vacuum at 60°C.

In this example about 10 per cent excess of 3-acetylamino-5-acetyl-methylamino-2,4,6-triiodobenzoic acid was used. In order to get rid of the excess of the monocarboxylic acid in the crude dicarboxylic acid product, the crude dried product was suspended in 800 ml methanol. (The dicarboxylic acid is soluble in methanol. The monocarboxylic acid has a very low solubility in in methanol). The methanol solution was separated from substance which had not been dissolved. The methanol solution containing the dicarboxylic acid was evaporated to dryness. The product was dissolved in 1 1 1N aqueous NaOH solution, whereupon an aqueous 5N solution of HCl was added in an amount sufficient to precipitate the dicarboxylic acid. The dicarboxylic acid was dissolved and reprecipitated once more in the same manner. The product was well washed with water, whereupon it was dried under vacuum at 60°C.

450 grams of the purified dicarboxylic acid and equivalent amounts of methylglucamine were dissolved in water to a solution volume of 1,000 ml. pH was adjusted to 7.3 – 7.4. The solution was filtered and poured into bottles which were sealed and sterilized in an autoclave at 110°C for 35 minutes. The solution was used in angiography with excellent results.

What we claim is:
1. A compound selected from the group consisting of (A) compounds of the formula

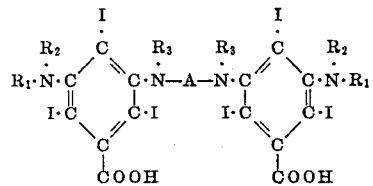

wherein $R_1$ is a member selected from the group consisting of methyl and ethyl and $R_2$ and $R_3$ are each a member selected from the group consisting of acetyl and propionyl and wherein A is an alkylene group substituted by at least one substituent of the formula — OH; said alkylene containing from three to 15 inclusive carbon atoms, and (B) physiologically acceptable salts thereof.

2. A compound as claimed in claim 1, wherein the bridge

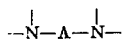

has each nitrogen atom thereof located at a distance of two carbon atoms from a group —OH and no more than one oxygen atom is bound to one and the same carbon atom in the bridge A.

3. A compound as claimed in claim 1, wherein the bridge A of the compound is a member selected from the group consisting of $-CH_2.CH(OH).CH_2 1-$ and $-CH_2.CH(OH).CH(OH).CH_2- . -$.

4. A compound selected from the group consisting of (A) compounds of the formula

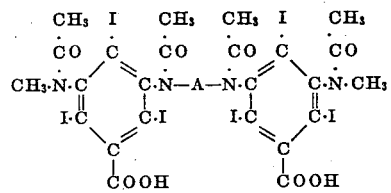

wherein A is an alkylene group substituted by at least one substituted of the formula —OH; said alkylene containing from three to 15 inclusive carbon atoms, and (B) physiologically acceptable salts thereof.

5. A compound of the formula

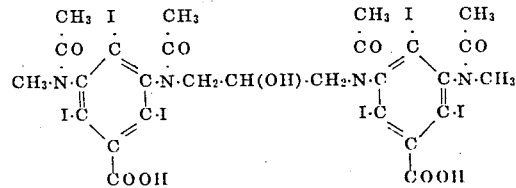

and non-toxic salts thereof.

6. A compound of the formula

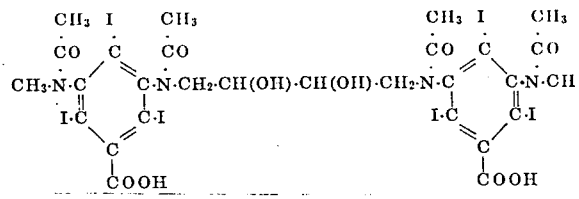

and non-toxic salts thereof.

7. A compound selected from the group consisting of (A) compounds of the formula

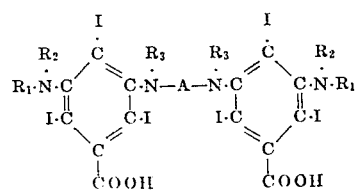

wherein $R_1$ is a member selected from the group consisting of methyl and ethyl and $R_2$ and $R_3$ are each a member selected from the group consisting of acetyl and propionyl and wherein A is an alkylene group substituted by at least one substituent of the formula — OH; said alkylene containing from three to 15 inclusive carbon atoms and being broken by at least one oxygen bridge of the salts — O —, and (B) physiologically acceptable salts thereof.

8. A compound as claimed in claim 7, wherein the bridge

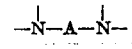

has each nitrogen atom located at a distance of two carbon atoms from a group —OH and that no more than one oxygen atom is bound to one and the same carbon atom in the bridge A.

9. A compound as claimed in claim 7, wherein the bridge A is a member selected from the group consisting of $-CH_2.CH(OH).CH_2.O.(CH_2)_4.O.CH_2.CH(OH).CH_2$ — and $-CH_2.CH(OH).CH_2.O.(CH_2)_2.O.CH_2.CH(OH).CH_2$ — and $-CH_2.CH(OH).CH_2.O.CH_2.CH(OH).CH_2-$ and $-CH_2.CH(OH).CH_2.O.CH_2.CH(OH).CH_2.O.CH_2.CH(OH).CH_2$ and

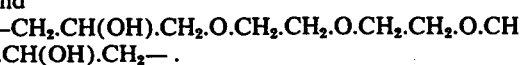

and $-CH_2.CH(OH).CH_2.O.CH_2.CH_2.O.CH_2.CH_2.O.CH_2.CH(OH).CH_2-$ .

10. A compound selected from the group consisting of (A) compounds of the formula

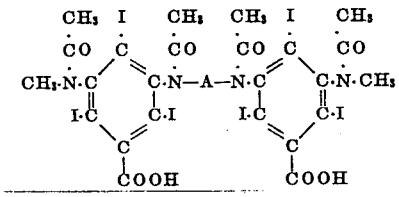

wherein A is an alkylene group substituted by at least one substituent of the formula —OH; said alkylene containing from three to 15 inclusive carbon atoms and being broken by at least one oxygen bridge of the formula — O —, and (B) physiologically acceptable salts thereof.

11. A compound of the formula

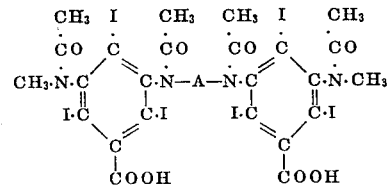

wherein A is a member selected from the group consisting of

CH₃
—CH₂·CH(OH)·CH₂·O·CH·CH₂·CH₂·O·CH₂—CH(OH)·CH₂—
and
—CH₂.CH(OH).CH₂.O.(CH₂)₂.O.CH₂.CH(OH).CH₂ — and
—CH₂.CH(OH).CH₂.O.CH₂.CH(OH).CH₂— and
—CH₂.CH(OH).CH₂.O.CH₂.CH(OH).CH₂.O.CH₂.CH(OH).CH₂ and non-toxic salts thereof.
12. A compound of the formula
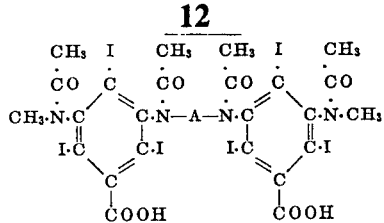
wherein A is
—CH₂.CH(OH).CH₂.O.(CH₂)₄.O.CH₂.CH(OH).CH₂— and non-toxic salts thereof.
* * * * *

UNITED STATES PATENT OFFICE
CERTIFICATE OF CORRECTION

Patent No. 3,692,824　　　　　　　Dated September 19, 1972

Inventor(s) LARS BJORK; UNO E. ERIKSON; BJORN G.-A. INGELMAN

It is certified that error appears in the above-identified patent and that said Letters Patent are hereby corrected as shown below:

In column 10, line 8 should read

"bridge of the formula - O -, and (B) physiologically acceptable salts thereof."

In column 10, lines 26 - 28 should read as follows:

$-CH_2.CH(OH).CH_2.O.CH_2.CH(OH).CH_2-$ and $-CH_2.CH(OH).CH_2.O.CH_2.CH(OH).CH_2.O.CH_2.CH(OH).CH_2-$ In Claim 11, the last formula should read $-CH_2.CH(OH).CH_2.O.CH_2.CH(OH).CH_2.O.CH_2.CH(OH).CH_2-$ The formula in column 4, lines 60 to 70 should read:

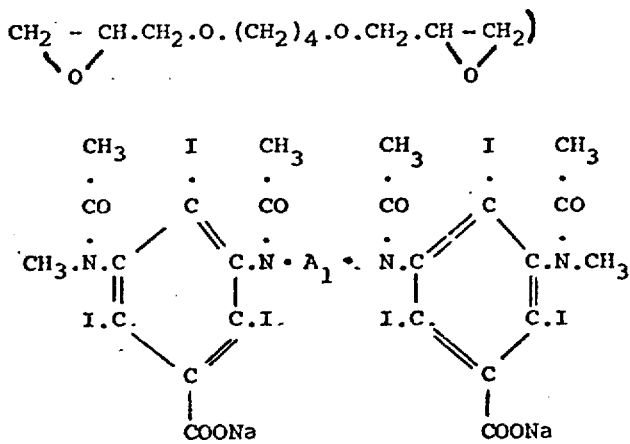

Patent No. 3,692,824
Page - 2

The last two lines in Claim 3 should read:

the group consisting of $-CH_2.CH(OH).CH_2-$ and $-CH_2.CH(OH).CH(OH).CH_2-$ .

The formula in Claim 6 should read:

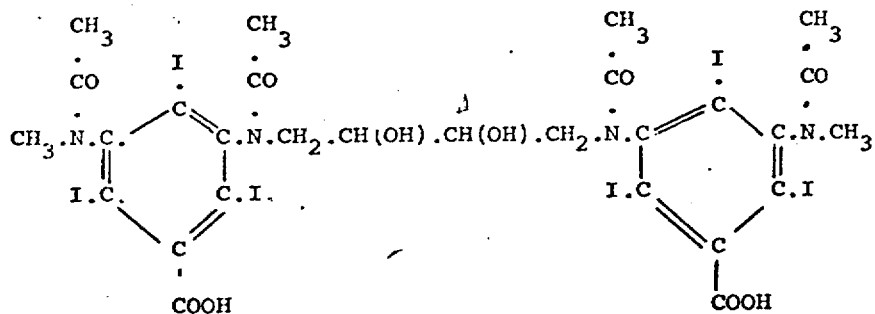

Signed and sealed this 25th day of September 1973.

(SEAL)
Attest:

EDWARD M. FLETCHER, JR.
Attesting Officer

RENE D. TEGTMEYER
Acting Commissioner of Patents

UNITED STATES PATENT OFFICE
CERTIFICATE OF CORRECTION

Patent No. 3,692,824  Dated September 19, 1972

Inventor(s) Lars Bjork et al.

It is certified that error appears in the above-identified patent and that said Letters Patent are hereby corrected as shown below:

In the grant (only) insert columns 1, 2, 3 and 4, as shown on the attached sheets.

Signed and sealed this 15th day of October 1974.

(SEAL)
Attest:

McCOY M. GIBSON JR.
Attesting Officer

C. MARSHALL DANN
Commissioner of Patents

NOVEL 3,5-SUBSTITUTED 2,4,6-TRIIODOBENZOIC ACIDS AND SALTS THEREOF

RELATED CASES

The present application, which is a continuation-in-part, discloses and claims subject matter common to copending U.S. Patent application Ser. No. 689,724 filed on Dec. 11, 1967, and now abandoned.

The present invention relates to novel 3,5-substituted 2,4,6-triiodobenzoic acids adapted to be used, for example, for the visualization of body cavities.

More particularly the present invention relates to compounds having the following formula:

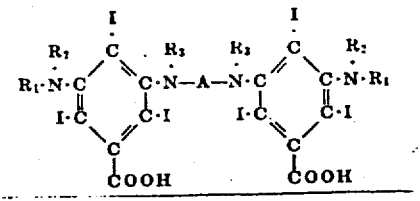

wherein $R_1$ is a member selected from the group consisting of methyl and ethyl, and $R_2$ and $R_3$ are each a member selected from the group consisting of acetyl and propionyl, and wherein A is an alkylene group substituted by at least one substituent of the formula —OH, said alkylene containing from three to 15 inclusive carbon atoms and being optionally broken by one or more oxygen bridges of the formula —O— and physiologically acceptable salts thereof.

According to a suitable embodiment of the invention the bridge

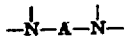

has each nitrogen thereof located at a distance of 2 carbon atoms from a group —OH. In this connection, preferably no more than one oxygen atom is bound to one and the same carbon atom in the bridge A. The bridge A suitably contains 3 - 10 carbon atoms in the alkylene group.

Examples of the bridge A in the above formulas are
—$CH_2.CH(OH).CH_2$— or
$CH_2.CH(OH).CH_2.O.CH_2.CH(OH).CH_2$— or
—$CH_2.CH(OH).CH_2.O.CH_2.CH_2.O.CH_2.CH(OH).CH_2$— or
—$CH_2.CH(OH).CH_2.O.(CH_2)_4.O.CH_2.CH(OH).CH_2$— or $$-CH_2\text{-}CH(OH)\text{-}CH_2\text{-}O\text{-}CH\text{-}CH_2\text{-}CH_2\text{-}O\text{-}CH_2\text{-}CH(OH)\text{-}CH_2-$$
$$\overset{|}{CH_3}$$

or
—$CH_2.CH(OH).CH_2.O.CH_2.CH_2.O.CH_2.CH_2.O.CH_2.CH(OH).CH_2$— or
—$CH_2.CH(OH).CH_2.O.CH_2.CH(OH).CH_2.O.CH_2.CH(OH).CH_2$ or
—$CH_2.CH(OH).CH(OH).CH_2$—

Examples of salts of the above compounds are the sodium salt, methylglucamine salt, tris-hydroxymethylamino methane salt, ethanolamine salt or other non-toxic salts. These can be used in the form of an aqueous solution.

As an example of valuable compounds can be mentioned:

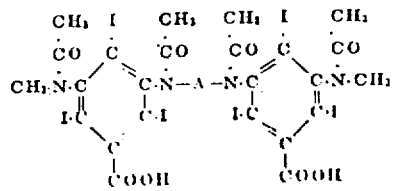

wherein A is an alkylene group substituted by at least one substituent of the formula —OH; said alkylene containing from three to 15 inclusive carbon atoms and being optionally broken by one or more oxygen bridges of the formula —O—, or physiologically acceptable salts thereof, e.g. the sodium salt, methylglucamine salt or ethanolamine salt.

As an example of such valuable compounds can be mentioned:

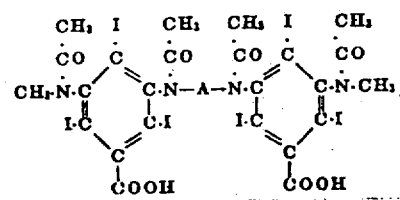

wherein A is
—$CH_2.CH(OH).CH_2.O.(CH_2)_4.O.CH_2.CH(OH).CH_2$
or
—$CH_2.CH(OH).CH_2.O.(CH_2)_2.O.CH_2.CH(OH).CH_2$
or
—$CH_2.CH(OH).CH_2.O.CH_2.CH(OH).CH_2$— or
—$CH_2.CH(OH).CH_2$— or
—$CH_2.CH(OH).CH(OH).CH_2$— or
—$CH_2.CH(OH).CH_2.O.CH_2.CH(OH).CH_2.O.CH_2.CH(OH).CH_2$ or $$-CH_2\text{-}CH(OH)\text{-}CH_2\text{-}O\text{-}CH\text{-}CH_2\text{-}CH_2\text{-}O\text{-}CH_2CH(OH)\text{-}CH_2-$$
$$\overset{|}{CH_3}$$

or
—$CH_2.CH(OH).CH_2.O.CH_2.CH_2.O.CH_2.CH_2.O.CH_2.CH(OH).CH_2$— or physiologically acceptable salts thereof, e.g. the sodium salt or methyl glucamine salt or ethanolamine salt.

The new compounds are very useful as X-ray contrast agents. A preparation for carrying out the X-ray investigations may suitably consist of a mixture, such as an aqueous solution, or contain a physiologically acceptable solid carrier, the preparation being preferably in tablet form or in the form of any other suitable dosage unit; and the mixture containing one or more of the aforesaid compounds as active contrast-producing substances.

In applying a preparation containing the contrast producing agent according to the invention, the preparation is administered to the body of the test object after which the body is exposed to X-rays, photographic or direct observation on a fluorescent screen or some other conventional X-ray technics is carried out in the usual manner. The dosage of the contrast-producing agent is selected in accordance with the category of the case to be investigated so that a sufficient contrast effect is attained.

One example of the various body cavities which can be visualized by the new compounds or by preparations tract. In this instance the contrast-producing agent is administered to the body perorally either as a solid or in solution. It is also possible to visibilize the intestines by introducing the contrast-producing agent rectally in the form of an enema. Another example is the advantageous visualization of blood vessels after the injection of the contrast-producing agent in the form of a sterile solution. It is of particular value that subsequent to intravenous injection of the contrast-producing agent, the latter is excreted not only with the urine but also with the bile and makes possible the visualization of the bile ducts and gall bladder in an advantageous manner. Further examples are the use of the iodine compounds in hysterosalpingography, cholangiography, urethrography, sialography, arthrography and urography.

The novel compounds according to the invention have a low toxicity, e.g. when they are given intravenously or orally, and present excellent characteristics as X-ray contrast agents.

As carriers for the novel compounds can be mentioned conventional additive substances, such as water with regard to injection solutions and extenders with regard to tablets.

If the preparation comprising a novel 3,5-substituted 2,4,6-triiodobenzoic acid according to the invention is in the form of an aqueous solution, the concentration of the active compound is chosen in accordance with the field of use. Preferably a content is chosen which exceeds 10 grams per 100 ml solution. However, generally a much higher content is chosen, e.g. in the order of 20, 30, 40, 50 or 60 grams or more per 100 ml solution.

The new compounds are also useful as intermediates for the synthesis of other X-ray contrast agents. The new compounds are also useful for the preparation of solutions having high density. Such solutions are useful for the separation of cells and cell fragments by centrifugation.

The aforesaid novel 3,5-substituted 2,4,6-triiodobenzoic acids are produced by reacting compounds of the formula:

$$\begin{array}{c} I \\ R_2-C\diagup{}^C\diagdown C-R_3 \\ R_1-N-C\phantom{xx}C-N-H \\ I-C\diagdown{}_C\diagup C-I \\ COOH \end{array}$$

or salts thereof, wherein $R_1$, $R_2$ and $R_3$ each have the significance set forth above, with compounds of a formula Y.A.X , wherein A has the above significance, and wherein Y and X are each a halogen atom, preferably chloro or bromo, or with corresponding epoxide compounds obtainable from the compound Y.A.X by splitting off hydrogen halide. The obtained compound is either recovered as such or in the form of a physiologically acceptable salt.

Examples of such salts are the sodium salt or methyl glucamine salt or ethanolamine salt. These salts are readily dissolved in water.

As examples of the bifunctional compounds of the type Y.A.X or corresponding epoxide compounds obtainable from the compounds Y.A.X by splitting off $$CH_2\text{---}CH\text{-}CH_2\text{-}O\text{-}(CH_2)_n\text{-}O\text{-}CH_2\text{-}CH\text{---}CH_2$$
$$\diagdown O \diagup \qquad\qquad \diagdown O \diagup$$

where $n$ is an integer from 2 to 4 inclusive, and $$CH_2\text{---}CH\text{-}CH_2\text{-}O\text{-}CH_2\text{-}CH\text{---}CH_2$$
$$\diagdown O \diagup \qquad \diagdown O \diagup$$

and $$CH_2\text{---}CH\text{-}CH_2\text{-}O\text{-}CH_2\text{-}CH\text{---}CH_2$$
$$\diagdown O \diagup \qquad \diagdown O \diagup$$

and $$CH_2\text{---}CH\text{-}CH_2\text{-}O\text{-}CH_2\text{-}CH(OH)\text{-}CH_2\text{-}O\text{-}CH_2\text{-}CH\text{---}CH_2$$
$$\diagdown O \diagup \qquad\qquad\qquad\qquad \diagdown O \diagup$$

and $$\begin{array}{c} CH_3 \\ | \\ CH_2\text{---}CH\text{-}CH_2\text{-}O\text{-}CH\text{-}CH_2\text{-}CH_2\text{-}O\text{-}CH_2\text{-}CH\text{---}CH_2 \\ \diagdown O \diagup \qquad\qquad\qquad\qquad \diagdown O \diagup \end{array}$$

and $$CH_2\text{---}CH\text{-}CH_2\text{-}O\text{-}CH_2\text{-}CH_2\text{-}O\text{-}CH_2\text{-}CH_2\text{-}O\text{-}CH_2\text{-}CH\text{---}CH_2$$
$$\diagdown O \diagup \qquad\qquad\qquad\qquad\qquad \diagdown O \diagup$$

or corresponding halogen hydrins, and bifunctional glycerine derivatives of the formula $X . CH_2 . CH(OH) . CH_2 - Y$, e.g. dichlorohydrin and dibromohydrin, or corresponding epoxy compounds of the formula $$CH_2\text{---}CH\text{-}CH_2\text{-}Y$$
$$\diagdown O \diagup$$

e.g. epichlorohydrin and epibromohydrin obtainable by splitting off hydrogen halide. Another example of such a bifunctional compound is 1:2, 3:4-diepoxybutane $$(CH_2\text{---}CH\text{-}CH\text{---}CH_2)$$
$$\diagdown O \diagup \diagdown O \diagup$$

which gives the bridge $-CH_2.CH(OH).CH(OH).CH_2-$.

The reaction is preferably carried out in a solvent, e.g. water or an aqueous liquid, and there is suitably added an alkaline reacting substance, e.g. alkali metal hydroxides, e.g. NaOH, the alkaline reacting substance acting as a catalyst. The alkaline substances may also act as an acceptor for hydrogen halide if this substance is released in the reaction.

The reactions are elucidated by the following reaction which is carried out in aqueous alkaline, e.g. NaOH solution:

$$\begin{array}{c} CH_3 \quad I \quad CH_3 \qquad\qquad CH_3 \quad I \quad CH_3 \\ | \qquad\quad | \qquad\qquad\qquad | \qquad\quad | \\ CO \quad C \quad CO \qquad\qquad CO \quad C \quad CO \\ CH_3\text{-}N\text{-}C\diagup{}^{\diagdown}C\text{-}N\text{-}H + Z + H\text{-}N\text{-}C\diagup{}^{\diagdown}C\text{-}N\text{-}CH_3 \longrightarrow \\ I\text{-}C\diagdown{}_{\diagup}C\text{-}I \qquad\qquad I\text{-}C\diagdown{}_{\diagup}C\text{-}I \\ C \qquad\qquad\qquad C \\ | \qquad\qquad\qquad | \\ COONa \qquad\qquad\qquad COONa \end{array}$$

(wherein Z is $$CH_2\text{---}CH\text{-}CH_2\text{-}O\text{-}(CH_2)_n\text{-}O\text{-}CH_2\text{---}CH_2)$$
$$\diagdown O \diagup \qquad\qquad\qquad \diagdown O \diagup$$

$$\begin{array}{c} CH_3 \quad I \quad CH_3 \quad CH_3 \quad I \quad CH_3 \\ | \qquad\quad | \qquad\quad | \qquad\quad | \\ CO \quad C \quad CO \quad CO \quad C \quad CO \\ CH_3\text{-}N\text{-}C\diagup{}^{\diagdown}C\text{-}N\text{-}A_1\text{-}N\text{-}C\diagup{}^{\diagdown}C\text{-}N\text{-}CH_3 \\ I\text{-}C\diagdown{}_{\diagup}C\text{-}I \quad I\text{-}C\diagdown{}_{\diagup}C\text{-}I \\ C \qquad\qquad C \end{array}$$